United States Patent [19]

Berger et al.

[11] 4,082,319
[45] * Apr. 4, 1978

[54] COUPLING SLEEVE

[75] Inventors: Sidney Berger, Great Neck; Salvatore Buda, East Hills; Burton Weintraub, Old Bethpage, all of N.Y.

[73] Assignee: Berger Industries, Inc., Maspeth, N.Y.

[ * ] Notice: The portion of the term of this patent subsequent to Oct. 5, 1993, has been disclaimed.

[21] Appl. No.: 703,101

[22] Filed: Jul. 6, 1976

[51] Int. Cl.² .............................................. F16L 19/02
[52] U.S. Cl. ...................................... 285/27; 285/31; 285/45; 285/388; 285/425
[58] Field of Search ............... 285/388, 387, 115, 276, 285/321, 305, 31, 32, 27, 45, 425

[56] References Cited

U.S. PATENT DOCUMENTS

| 738,503 | 9/1903 | Waters | 285/276 X |
|---|---|---|---|
| 798,078 | 8/1905 | Simpson | 285/388 |
| 2,253,018 | 8/1941 | Cowles | 285/388 X |
| 2,310,490 | 2/1943 | Melsom | 285/305 X |
| 3,181,896 | 5/1965 | Russell | 285/387 X |
| 3,544,281 | 12/1970 | Phillips | 285/DIG. 22 X |
| 3,984,130 | 10/1976 | Berger et al. | 285/354 X |

FOREIGN PATENT DOCUMENTS

| 755,118 | 8/1956 | United Kingdom | 285/388 |
|---|---|---|---|
| 714,600 | 9/1954 | United Kingdom | 285/321 |

Primary Examiner—Thomas F. Callaghan
Attorney, Agent, or Firm—Kirschstein, Kirschstein, Ottinger, Frank & Cobrin

[57] ABSTRACT

A coupling sleeve for joining the ends of two conduits. One end is threaded, the other is unthreaded. The coupling sleeve has a female thread which engages the threaded end. The unthreaded end has a terminal portion of reduced external diameter running to an inwardly displaced groove in which a locking ring is disposed. The end of the coupling sleeve which engages the unthreaded conduit end has a recess in which the locking ring is axially slidable and a flange that engages a full diameter external section of the unthreaded end. The recess is long enough to permit the coupling sleeve to be fully received on the unthreaded conduit end when the female thread is disengaged from the threaded end of the conduit.

6 Claims, 4 Drawing Figures

COUPLING SLEEVE

REFERENCE TO RELATED APPLICATIONS

This application is a copending application of our prior filed applications Ser. No. 559,019 filed Mar. 17, 1975 for PIPE JOINT FOR AN INTERMEDIATE METAL CONDUIT (now U.S. Pat. No. 3,984,130) and Ser. No. 612,030 filed Sept. 10, 1975 for JOINT FOR CONDUIT WITH SINGLE THREADED END. There is described in the above noted copending applications a combination of a conduit section and a coupling sleeve captively mounted thereon which permits the disassembly of joined conduit sections in a run of conduit without the necessity of having to longitudinally displace adjacent conduit sections before they may be removed laterally from the run.

BACKGROUND OF THE INVENTION

1. Field of the Invention

The invention relates to a coupling sleeve for conduit and more particularly, to a coupling sleeve designed for limited axially inward and axially outward movement on the end of the conduit section on which it is captively retained.

2. Prior Art

There are on the market conduit section and coupling sleeve combinations in which the coupling is captively held on the conduit section and which do not permit adjacent joined conduit sections to be separated from a run of conduit without the necessity of longitudinally displacing the conduit sections.

One widely employed method of joining sections of conduit involves the use of coupling sleeves having both ends threaded into which the threaded ends of conduit sections were advanced. Another method involves using a coupling sleeve which through a lock ring means is rotatably mounted to an end of one conduit and which is advanced onto the threaded end of an adjacent conduit section. The coupling sleeve is either limited to rotational motion only on the conduit or is permitted unlimited axial movement thereon. Since the prior art did not disclose the combination of the conduit section and a captive coupling sleeve which is freely rotatable and which is permitted limited axially inward and axially outward movement on the end of the conduit section, the need for the coupling sleeve of the present invention was absent. Generally, the coupling sleeves disclosed in the prior art could not be incorporated into the combination disclosed in our above identified patent applications.

Further, none of the prior art coupling sleeves are provided with annular extensions which are adapted to protect the external threads on the adjacent conduit section and which are not engaged with the threads on the coupling sleeve. Moreover, none of the coupling sleeves are constructed with spaces which would collect foreign material that is trapped between the coupling sleeve and the conduit section in order to insure the proper cooperation of the coupling sleeve with the associated lock ring means on the conduit section.

It was toward elimination of these problems that the present invention is directed.

SUMMARY OF THE INVENTION

1. Purposes of the Invention

It is an object of the present invention to provide a coupling sleeve which is adapted to cooperate with a non-threaded end of a conduit section having an area of reduced outside diameter extending from one end face to form a stop shoulder with a lock ring means positioned in an annular lock ring groove located axially inwardly of the stop shoulder so that the coupling sleeve is permitted to rotate freely on the end of the conduit section and permitted only limited axially inward and axially outward sliding movement on the end of the conduit section.

Another object of the present invention is to provide a coupling sleeve having a pair of flanges at opposite ends which cooperate with a stop shoulder and a lock ring means on the non-threaded end of a conduit section.

A further object of the present invention is to provide a coupling sleeve having two inwardly extending flanges wherein one of the flanges has an axially outward face which is configured to engage the lock ring means and to prevent the camming inwardly of the lock ring means into the annular groove when the coupling sleeve is subjected to an axially outwardly directed force.

Yet another object of the present invention is to provide a coupling sleeve having a space into which foreign material which has been trapped between the coupling sleeve and the conduit section can collect in order to prevent its interfering with the cooperation of the coupling sleeve and the lock ring means.

Still another object of the present invention is to provide a coupling sleeve adapted to protect the threads on the conduit section to which it is threaded that are not engaged by the threads on the coupling sleeve.

A still further object of the present invention is to provide a coupling sleeve adapted to aid in the alignment of the conduit sections which it joins.

Other objects of the present invention in part will be obvious and in part will be apparent in the following description.

2. Brief Description of the Invention

Generally speaking, the above and other objects are accomplished by providing a coupling sleeve that is adapted to be captively attached to a non-threaded end of a conduit section and which is rotatable and permitted only limited axial displacement thereon. The coupling sleeve has a general cylindrical body having an axially inward and an axially outward end. A first flange at the axially inward end defines a central opening of a diameter slightly greater than the outside diameter of the conduit section. The first flange may be provided with a camming surface on its axially inward face and is provided with an axially outward face that is substantially perpendicular to the longitudinal axis of the conduit section. The second flange adjacent the axially outward end of the coupling sleeve defines a central opening of a diameter less than the outside diameter of the conduit section, but which is greater than the diameter of a length of reduced outside diameter which extends from the end face of the conduit section. The second flange has female threads formed therein. An axial clearance is provided in the coupling sleeve between the first and second flanges. The first and second flanges cooperate with a stop shoulder formed in the conduit section created by the length of reduced outside diameter and a lock ring means which is positioned in an annular groove spaced axially inwardly of the stop shoulder to captively retain the coupling sleeve on the conduit section while permitting only limited axially inward and axially outward movement of the coupling sleeve thereon.

An annular extension is provided on the coupling sleeve at its axially outward end which serves to shield the threads formed on the external surface of an adjacent conduit section which are not engaged by the female threads formed on the second flange when the two conduit sections are joined by the coupling sleeve. This annular extension also aids in positioning the ends of the two conduit sections so that the threads on the second flange and on the adjacent conduit section are, initially, correctly engaged.

An annular undercut is provided where the axially outward face of the first flange meets a wall of the axial clearance. The annular undercut aids in the proper formation of the axially outward face and acts as a collection space for foreign material that has become trapped between the coupling sleeve and the conduit section so that the material will not interfere with the cooperation of the axially outward face and the lock ring means when the coupling sleeve is subjected to an axially outwardly directed force.

The invention consists in the features of construction and arrangement of parts which will be detailed hereinafter and described in the appended claims.

BRIEF DESCRIPTION OF THE DRAWINGS

For a better understanding of the present invention, reference should be had to the accompanying drawings wherein like numerals of reference indicate similar parts throughout the several views and wherein.

DESCRIPTION OF THE PREFERRED EMBODIMENT

In the specification and the claims which follow, the terms "axially inwardly" and "axially outwardly" are used with reference to the end face of the conduit section on which the coupling sleeve is retained, that is "axially inwardly" refers to a vector extending from that end face of the conduit section towards the other end face of the conduit section. Conversely, "axially outwardly" refers to a vector extending outwardly away from that end face. The term "section" is defined to mean a conduit of a length which is equal to at least four (4) times the outer, i.e. external, diameter of the conduit. A typical section is from 10 to 20 feet long.

Figure 1:
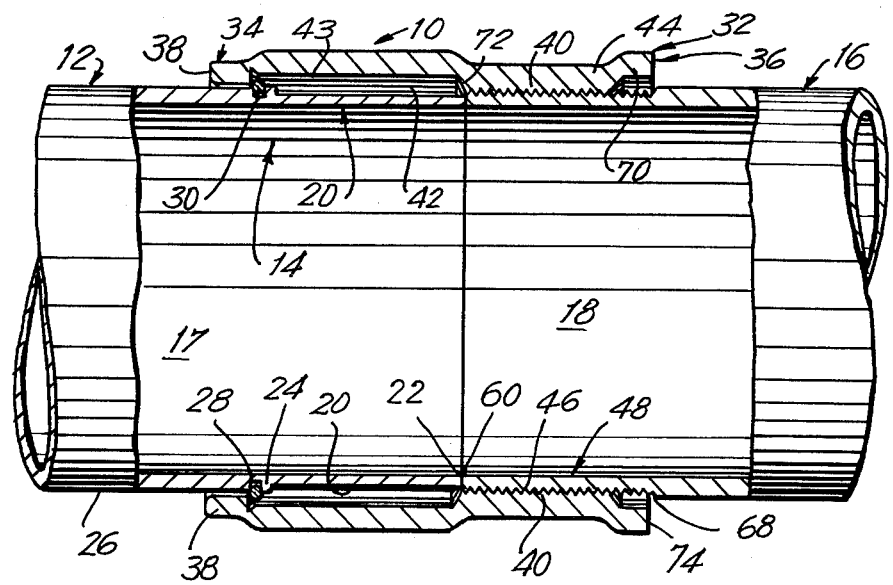
FIG. 1 is a sectional axial view of two conduit sections joined by a coupling sleeve in accordance with the present invention.
Figure 2:
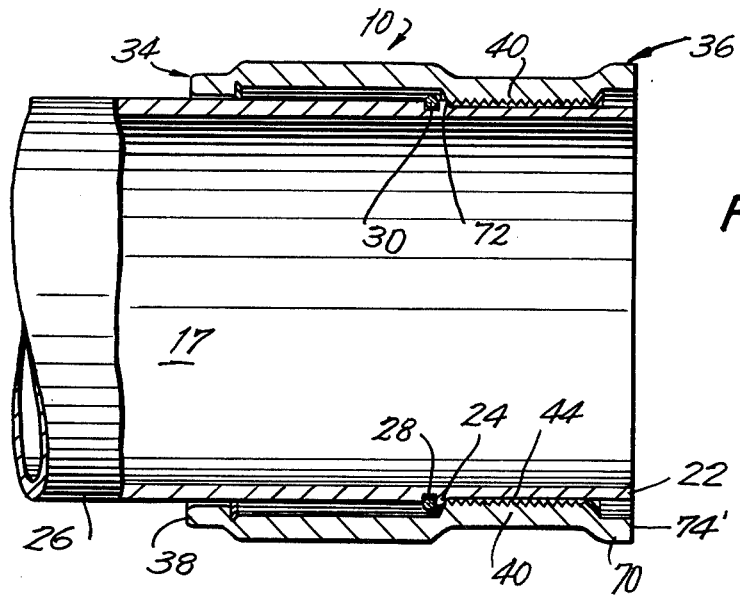
FIG. 2 is a sectional axial view of a conduit section showing the coupling sleeve in accordance with the present invention displaced axially inwardly thereon.

With reference to FIGS. 1 and 2, there is illustrated a coupling sleeve identified generally by the reference numeral 10 mounted on the end of a first conduit section 12. As will hereinafter be described, the coupling sleeve 10 is permitted only limited axially inward and axially outward movement with respect to the non-threaded end 14 of the first conduit section 12 to allow the first conduit section 12 to be joined to an adjacent second conduit section 16 and to permit the coupling sleeve 10 to be moved axially inwardly, i.e. backed off the end of the second conduit section 16 when the first and second conduit sections are joined to enable the first conduit section 12 to be laterally displaced from the second conduit section 16 without the need of longitudinally displacing the first conduit section 12 with respect to the second conduit section 16.

The combination of the coupling sleeve and conduit sections as just described is discussed in detail and claimed in our pending United States applications Ser. Nos. 559,019 filed Mar. 17, 1975 and 612,030 filed Sept. 10, 1975.

Briefly, the first conduit section 12 and the identical adjacent second conduit section 16 have constant diameter axial passageways 17 and 18 respectively therethrough. Both conduit sections have constant outer diameters except as described below. The coupling sleeve 10 is mounted captively on the non-threaded end 14 of the first conduit section 12 and is freely rotatable thereon and axially slideable to a limited extent. The first conduit 12 has a length 20 of reduced outside diameter extending axially inwardly from a flat end face 22 of the first conduit section 12 to create a stop shoulder 24 in the outer wall surface 26 of the first conduit section. An annular lock ring groove 28 in the outer wall surface is spaced axially inwardly from the stop shoulder 24. A constrictable lock ring means 30 is located within the annular lock ring groove 28 and in its normally unbiased condition partially projects from the annular lock ring groove. The coupling sleeve 10 is provided with abutment means thereon which will hereinafter be described which cooperates with the lock ring means 30 and the stop shoulder 24 to permit limited axially inward and axially outward movement of the coupling sleeve on the non-threaded end 14 of the first conduit section 12 as hereinabove mentioned. The lock ring means is made of spring steel.

With continued reference to FIG. 1, the coupling sleeve 10 includes a cylindrical body 32 which can be of any suitable material such as steel, malleable iron, bronze, or an aluminum alloy or a zinc die cast alloy. The body 32 has a first end 34 and a second end 36 which correspond to the axially inward end and axially outward end respectively of the coupling sleeve 10. The sleeve body 32 has a first radially inwardly extending flange 38 at the axially inward end thereof and a second radially inwardly extending flange 40 spaced axially outwardly from the first flange 38 adjacent the axially outward end 36. The first flange 38 and the second flange 40 define central openings of different diameters that are in axial alignment. The first flange 38 defines an opening slightly greater than that of the outer wall surface 26 of the first conduit section 12. The second flange 40 defines a central opening which is less in diameter than the diameter of the outer wall surface 26, but which is slightly greater than the diameter of the reduced diameter length 20. Between the flanges 38 and 40, there is formed an axial annular central groove 42 having a diameter greater than that of the first flange 38 thereby to create an axial clearance with an axially extending wall. A female machine thread 44 is formed in the second flange 40. The female machine thread 44 is dimensioned to mesh initially with the male pipe threads 46 on the end 48 of the second conduit section 16. Since the male threads 46 are tapered and the female threads 44 are not, when the threads are mated and tightened they will eventually jam. The coupling sleeve 10 may be slipped onto the non-threaded end 14 of the first conduit section 12 and it is the interaction of the first and second flanges 38 and 40 with the lock ring means 30 and the stop shoulder 24 respectively which captively retains the coupling sleeve 10 on the unthreaded end 14 of the conduit section.

Figure 3:
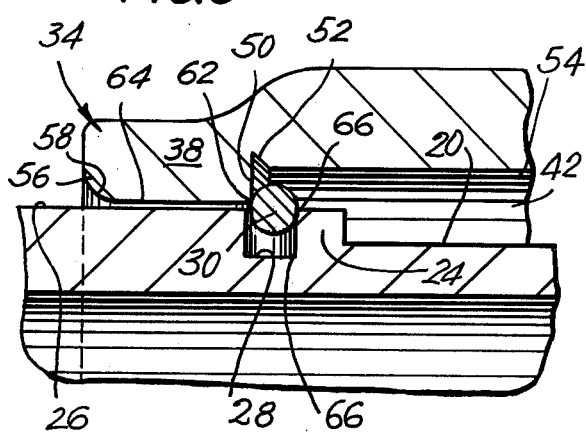
FIG. 3 is an enlarged sectional axial view showing the interaction of the flange on a coupling sleeve in accordance with the present invention with a lock ring means on the conduit section.

With reference to FIG. 3, the first flange 38 has an axially outward surface 50 which is so configured as to inhibit camming of the lock ring means 30 radially inwardly when the surface is disposed axially inwardly of the lock ring means and is being pulled axially outwardly. For this purpose, the surface 50 is substantially perpendicular to the longitudinal axis of the first conduit section or it may extend radially outwardly away from the axially outward end 36.

If the lock ring means 30 comprises a single lock ring of circular cross-section as illustrated, or a single lock ring of rectangular cross-section, it is imperative that the surface 50 of the flange 38 not be sloped radially outwardly from the conduit section 12 toward the axially outward end 36 to prevent the camming, inwardly, of the lock ring means 30 into the annular lock ring groove 28 as the coupling sleeve is forced axially outward.

To this end, during the formation of the coupling sleeve an annular undercut 52 is formed between the surface 50 and the axial wall 54 of the axial clearance 42, to ensure that the full width of the surface 50 is substantially perpendicular to the longitudinal axis of the coupling sleeve. Moreover, since the conduit sections are primarily used in the construction trades, it is quite easy for foreign material such as sand, metal chips or grease to become trapped between the coupling sleeve 10 and the outer wall surface of the conduit section. The annular undercut 52 acts as a collection space for this material so that it will not interfere with the interaction of the axially outward face 50 and the lock ring means 30 as will hereinafter be described.

The sequential steps in the cooperation of the first flange 38 with the lock ring means 30 as the coupling sleeve 10 is mounted on the non-threaded end 14 of conduit section 12 is described in detail in our above noted copending United States applications and therefore, for the sake of brevity, will not be discussed in detail herein. As discussed therein, the axially inward face 56 of the first flange 38 may be provided with a camming surface 58 to exert a radially inward constrictive force on the lock ring means 30 as the coupling sleeve 10 is first mounted on the conduit section 12 to permit the flange 38 to pass therever. Once the first flange 38 clears the lock ring means, it returns to its normal position within the annular clearance.

FIG. 1 illustrates the first conduit section 12 and the second conduit section 16 joined by the coupling sleeve 10. The first conduit section 12 has a flat end face 22 and the second conduit section has a flat end face 60 both of which are substantially perpendicular to the longitudinal axis of the conduit sections. The conduit sections are joined by butting the end face 22 at the non-threaded end 14 of the first conduit section 12 with the end face 60 at the externally threaded end 48 of the second conduit section 14. The coupling sleeve is then threaded onto the end 48 until the corner 62 formed by the axially outward surface 50 and the face 64 on the first flange engages the lock ring means 30. As an effort is made to tighten the coupling sleeve 10 further along the end 48, an axially outwardly directed force is created causing the lock ring means 30 to be pressed against the axially inward face 66 of the annular lock ring groove 28. The lock ring means 30 will not be forced inwardly into the groove, but the force will be transmitted to the end face 22 of the first conduit section 12 causing the face to be squeezed against the juxtapositioned end face 60 of the conduit section 16. The tapered male thread 46 is so dimensioned relative to the female thread 44 on the second flange 40 that the threads start to jam, but have not fully jammed when the desired squeezing pressure has been developed at the abutment between the juxtapositioned end faces 22 and 60.

As mentioned hereinabove, the diameter of the axially extending wall 43 of the axial clearance 42 is greater than the diameter of the central opening formed by the first flange 38. The diameter of the axially extending wall is also greater than the outer diameter of the lock ring means 30 when the lock ring means is in its normal unrestricted condition. Preferably, the difference between the two diameters is less than the thickness of the lock ring means so that, if by accident the lock ring means 30 should be cammed outwardly from the lock ring groove as the coupling sleeve is subjected to an axially outwardly directed force, the lock ring means will jam between the axially extending wall 54 of the axial clearance 42 and the stop shoulder 24 so that the coupling sleeve will be retained on the conduit section 12.

In order to prevent damage to the male pipe threads 68 which are not engaged by the female threads 44, i.e. those threads which would normally be exposed when the coupling sleeve is fully advanced on the threaded end 48, the coupling sleeve 10 may be provided with an annular extension 70 at its axially outward end 36 which defines a central opening which is in axial alignment with the central openings formed by the first and second flanges and which is of a diameter slightly greater than the diameter outer wall surface of the second conduit section 16. The annular extension 70 is so dimensioned to shield i.e., cover the threads 68 formed on the conduit section 16 which are not engaged by the threads 44 on the second flange 40. Preferably, the central opening formed by the annular extension 70 is equal in diameter to the central opening formed by the first flange 38.

In addition, the annular extension 70 aids in the alignment of the end 48 of the second conduit section 16 with the first conduit section 12 in that it forms an annular seat into which the end 48 can be inserted. It further aids to ensure the proper engagement of the female threads 44 with the male threads 46 as the coupling sleeve 10 is advanced on the end 48 of the second conduit section 16 to ensure that the threads mesh properly.

Figure 4:
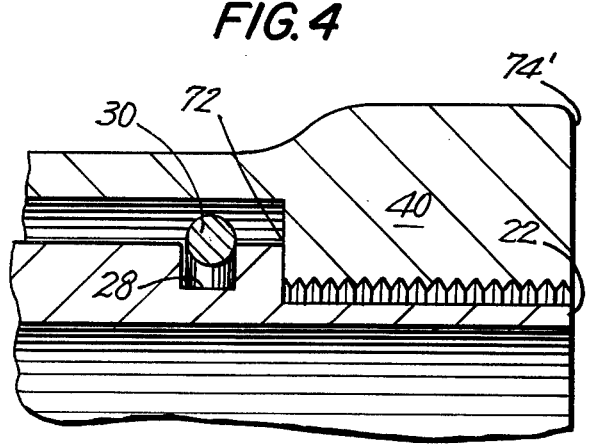
FIG. 4 is an enlarged sectional axial view of a portion of a coupling sleeve in accordance with an alternative embodiment of the present invention in a position similar to that illustrated in FIG. 2.

In FIG. 2, there is illustrated the coupling sleeve 10 in a position in which it is moved axially inwardly on the first conduit section 12. The axially inward face 72 on the second flange abuts the stop shoulder 24 with the length of reduced outside diameter 20 such that when face 72 abuts the stop shoulder 24, the axially outward end face 74 of the coupling sleeve 10 on the annular extension 70 is at least flush with the end face 20 of the conduit section 12 so that the conduit section 12 can be laterally displaced from the conduit section 16 without having to be displaced longitudinally thereof. Obviously, if the annular extension 70 were omitted from the axially outward end 36 of the coupling sleeve, then, when the face 72 abuts the stop shoulder, the axially outward end face 74' of the coupling sleeve 10 would be at least flush with the end face of the conduit section 12 as described in our copending applications and illustrated in FIG. 4.

If, as is often the case in field installations, the sections to be joined are not in, or cannot be brought into, an axial alignment sufficiently good to join rigid pipe sections with a threaded coupling, the sections still may be joined with ease. The central openings formed by the first flange 38 and the second flange 40 are slightly greater than the outer wall surface 26 and the reduced diameter area 20 respectively so that there is a slight clearance of about 0.020 to 0.040 inch, on the diameter, between the flanges and the outer wall of the conduit. This clearance permits a slight swivelling of the coupling sleeve 10 on the end of section 12 up to about ½° away from the longitudinal axis of the section. Therefore, the female thread on the coupling sleeve can mate readily with the male thread on the end of an adjoining conduit section even if the sections are not in exact axial alignment. The end faces of the sections will not abut each other initially in this situation, but they will abut after the coupling sleeve is tightened and the sections flex slightly to accomodate the abutment.

It can be seen from the foregoing that the objects of the present invention namely to provide a coupling sleeve which is adapted to be mounted on the non-threaded end of a conduit section and which can be rotatably captively held thereon and permitted axially inward and axially outward movement to only a limited extent includes a generally cylindrical body having an axially inward and axially outward end. A first flange is provided at the axially inward end and defines a central opening of a diameter slightly greater than the outside diameter of the conduit section on which the coupling sleeve is mounted. The first flange may have a camming surface on its axially inward end face and is provided with an axially outward face which is substantially perpendicular to the conduit section. A second flange is provided adjacent the axially outward end of the coupling sleeve and defines a central opening of a diameter less than the diameter of a length of reduced outside diameter that extends axially inwardly from the end face of the conduit section. Thread means are provided on the second flange which are adapted to engage external thread means on the end of an adjacent conduit section. An axial clearance is provided between the first and second flanges which has an axially extending wall. The first and second flanges cooperate with a stop shoulder formed in the conduit section which is created by the length of reduced outside diameter and a lock ring means which is positioned in an annular lock ring groove on the conduit section spaced axially inwardly of the stop shoulder to captively retain the coupling sleeve on the conduit section while permitting limited axially inward and axially outward movement of the coupling sleeve thereon.

The axially outward face of the first flange is formed to prevent the camming of the lock ring means inwardly into the annular lock ring groove when the coupling sleeve is subjected to an axially outwardly directed force. An annular undercut is created between the first flange and the axially extending wall of the axial clearance to ensure the proper orientation of the axially outward face of the first flange and to act as a collection area for foreign material trapped between the coupling sleeve and the conduit section to ensure the proper cooperation of the first flange and the lock ring means.

An annular extension is provided at the axially outward end of the coupling sleeve and defines a central opening in axial alignment with the central openings formed by the first and second flanges and which is equal to or greater than the central opening formed by the first flange. The annular extension serves to shield the threads on an adjacent conduit section which are not engaged by the thread means on the second flange when the two conduit sections are joined. The annular extension also serves as a guide means to ensure proper alignment of the coupling sleeve on the end of an adjacent conduit section and proper engagement of the thread means on the coupling sleeve and the conduit section.

While in accordance with the patent statutes preferred and alternative embodiments of the present invention have been set forth in detail, it is to be understood that the invention is not limited thereto or thereby.

What is claimed is:

1. A coupling sleeve for joining a first and a second conduit section, each of said conduit sections having two ends and a length equal to at least four times its external diameter, and having circular cylindrical outer wall surfaces with an axial passage of constant cross-sectional dimensions and configurations, one end of each of said conduit sections having a flat substantially perpendicular end face and external thread means thereon and the other end of each of said conduit sections being non-threaded and having a flat substantially perpendicular end face and a length of reduced outside diameter extending axially inwardly from said flat substantially perpendicular end face at said other end of said conduit section to form a stop shoulder in said outer wall surface at said non-threaded end, and a lock ring means positioned in a lock ring groove located in said outer wall surface near and spaced axially inwardly from said stop shoulder, said lock ring means in its normal unbiased condition projecting in part above said outer wall surface, said coupling sleeve comprising:

(a) a body having an axially inward end with an end face and an axially outward end with an end face;

(b) a first radially inwardly extending flange at said axially inward end;

(c) a second radially inwardly extending flange adjacent said axially outward end, said second flange having female thread means thereon;

(d) said first flange defining a central opening of a diameter slightly greater than the diameter of said outer wall surface;

(e) said second flange defining a central opening smaller than the diameter of said outer wall surface, but slightly greater than the diameter of said length of reduced outside diameter, said central openings being in axial alignment so that said coupling sleeve may be slipped onto said other non-threaded end of said first conduit section;

(f) an axial clearance formed between said first and second flanges having an axially extending wall; and (g) an annular undercut disposed between an axially outward face of said first flange and said wall of said axial clearance constructed and arranged to receive foreign material trapped between said axially outward face of said first flange and said lock ring means to ensure proper cooperation of said outward face with said lock ring means, (h) at least one of said lock ring means and a cooperating surface of said first flange having camming means to constrict said lock ring means into said annular lock ring groove when said coupling sleeve is moved axially inwardly on said non-threaded end of said first conduit section;

(i) said axial clearance receiving said lock ring means when it returns to its normal unbiased position as said first flange clears said lock ring means;

(j) said axially outward face of said first flange adapted to cooperate with said lock ring means to prevent said lock ring means from being forced radially inwardly entirely into said lock ring groove so that said coupling sleeve is prevented from being pulled axially outwardly from said other non-threaded end of said first conduit section as said coupling sleeve is threaded onto said one externally threaded end of said second conduit section so as to force said end faces of said first and second conduit sections together;

(k) said length of reduced outside diameter extending axially inwardly at least the width of said second flange so that said coupling sleeve may be backed off said externally threaded end of said second conduit section after said first and second conduit sections are assembled whereby said second flange will abut said stop shoulder and said end face of said coupling sleeve will be at least flush with said flat substantially perpendicular end face of said first conduit section to permit said first conduit section to be laterally displaced from said second conduit section without longitudinal movement of either conduit section.

2. The coupling sleeve in accordance with claim 1 wherein said body further includes an annular extension projecting axially outwardly from said second flange defining a central opening of a diameter slightly greater than the diameter of said outer wall surface, said central opening being in axial alignment with said central openings formed by said first and second flanges, said length of reduced outside diameter being at least equal to the combined width of said second flange and the length of said annular extension.

3. The coupling sleeve in accordance with claim 2 wherein said central opening defined by said first flange and said central opening defined by said annular extension are equal in diameter.

4. The coupling sleeve in accordance with claim 2 wherein said annular extension projects from said second flange a distance equal to at least the length of said external threads exposed on said second conduit section when said coupling sleeve is threaded onto said second conduit section so as to force said end faces of said first and second conduit sections together.

5. The coupling sleeve in accordance with claim 1 wherein said axially outward face of said first flange is substantially perpendicular to the longitudinal axis of said first conduit section.

6. The coupling sleeve in accordance with claim 1 wherein said central opening defined by said first flange and said central opening defined by said second flange are dimensioned to create a clearance between said first flange and said outer wall surface and said second flange and said length of reduced outside diameter to permit swivelling of said coupling sleeve on said non-threaded end of said first conduit section so that said female thread means on said second flange can mate with said external thread means on said other end of said second conduit section when said first and second conduit sections are not in exact axial alignment.

* * * * *